United States Patent
Kumar

(10) Patent No.: US 8,600,902 B2
(45) Date of Patent: Dec. 3, 2013

(54) METHOD AND SYSTEM FOR GENERATING SHIPPING LABELS

(75) Inventor: Rachel Marie Kumar, San Jose, CA (US)

(73) Assignee: eBay Inc., San Jose, CA (US)

(*) Notice: Subject to any disclaimer, the term of this patent is extended or adjusted under 35 U.S.C. 154(b) by 1239 days.

(21) Appl. No.: 11/642,222

(22) Filed: Dec. 20, 2006

(65) Prior Publication Data

US 2008/0154781 A1 Jun. 26, 2008

(51) Int. Cl.
*G06Q 30/00* (2012.01)
*G06Q 10/00* (2012.01)

(52) U.S. Cl.
USPC ................... 705/330; 705/1.1; 705/26.41

(58) Field of Classification Search
USPC ............. 705/1.1, 7.11–7.42, 26.1–26.44, 705/330–342; 707/1
See application file for complete search history.

(56) References Cited

U.S. PATENT DOCUMENTS

| 6,006,200 | A | * | 12/1999 | Boies et al. | 705/26 |
| 2001/0029496 | A1 | * | 10/2001 | Otto et al. | 705/74 |
| 2003/0115072 | A1 | * | 6/2003 | Manucha et al. | 705/1 |
| 2006/0178994 | A1 | * | 8/2006 | Stolfo et al. | 705/50 |

* cited by examiner

*Primary Examiner* — George Chen
(74) *Attorney, Agent, or Firm* — Schwegman Lundberg & Woessner, P.A.

(57) ABSTRACT

A system generates an encoded identifier representing shipping data associated with the first party, wherein the shipping data is associated with a transaction between the first party and a second party. The system then communicates the encoded identifier to the second party and the second party creates a shipping label including the encoded identifier. The encoded identifier is decoded by a shipping service provider thus providing the shipping data of the first party.

22 Claims, 6 Drawing Sheets

METHOD AND SYSTEM FOR GENERATING SHIPPING LABELS

TECHNICAL FIELD

This application relates to providing a seller in a network-based shopping system with shipping data that preserves private information associated with a buyer.

BACKGROUND

Protecting personal data is of great concern, particularly with respect to network based transactions. This issue is particularly evident in the online purchase of physical goods. People often attempt to protect their personal data, such as their name, address, credit card data, etc., by paying cash to avoid sharing credit card data and using secondary or fake email addresses to prevent receiving spam email. However, with physical goods, unless a physical pick up is arranged, divulging of a buyer's name, and at the very least address, is a necessity that puts the buyer's personal data at risk.

BRIEF DESCRIPTION OF THE DRAWINGS

The present invention is illustrated by way of example, and not by way of limitation, in the figures of the accompanying drawings in which.

DETAILED DESCRIPTION

Although the invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In one embodiment, a system and method protects private data of a first party by generating an encoded identifier representing shipping data associated with the first party, wherein the shipping data is associated with a transaction between the first party and a second party. The encoded identifier is then communicated to the second party and the second party creates a shipping label including the encoded identifier. The encoded identifier is then decoded by a shipping service provider thus providing the shipping data of the first party.

Platform Architecture

Figure 1:
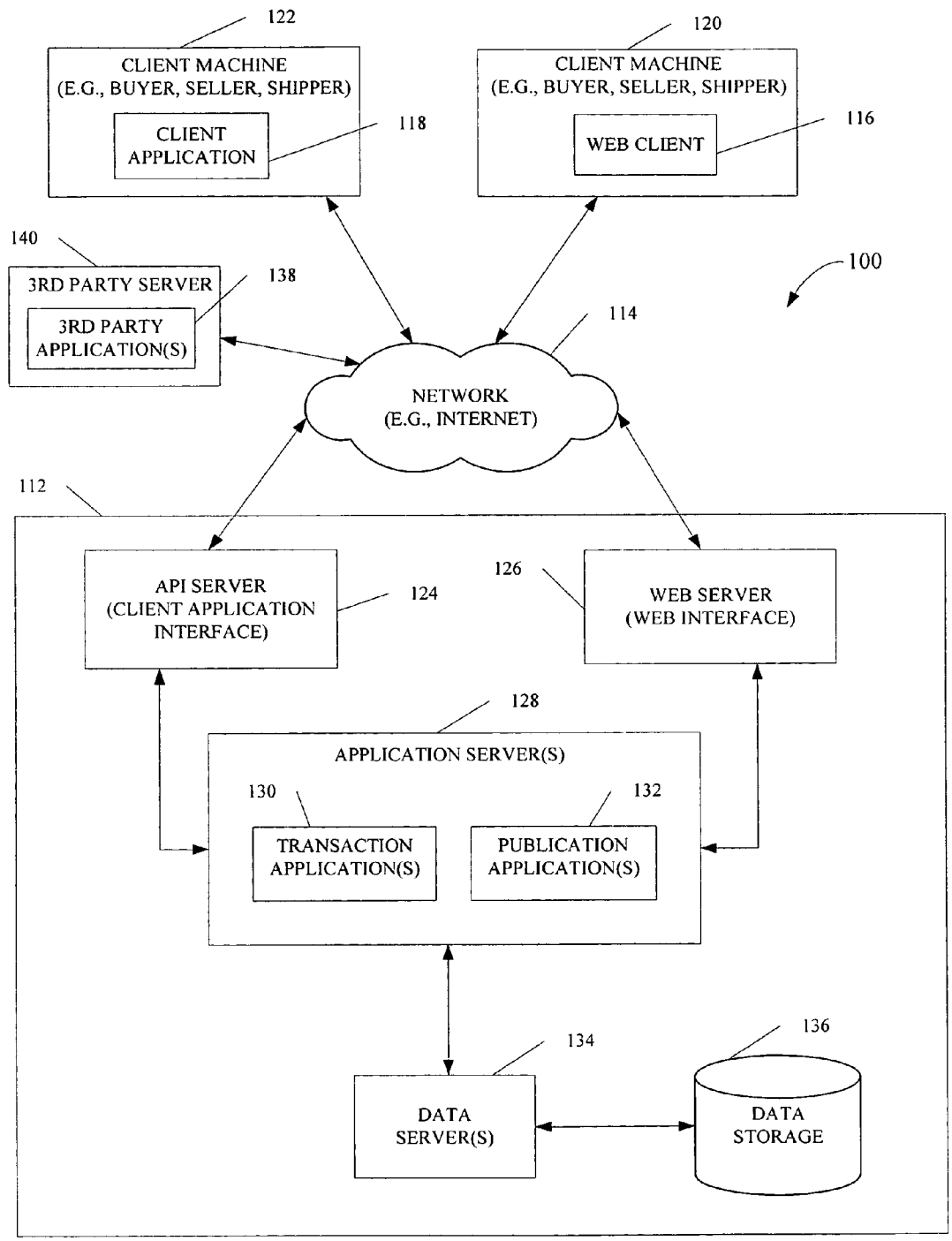
FIG. 1 is a network diagram depicting a transaction system, according to one embodiment, having a client-server architecture configured for exchanging data over a network.

FIG. 1 is a network diagram depicting a transaction system 100, according to one embodiment, having a client-server architecture configured for exchanging data over a network. The transaction system 100 may be a publishing system where clients may communicate, view, search, and exchange data with the publishing system. For example, the transaction system 100 may include various applications for interfacing with client machines and client applications that may be used by users (e.g., buyers and sellers) of the system to publish items for sale in addition to facilitating the purchase and shipment of items.

A data exchange platform, in an example form of a network based publisher 112, may provide server-side functionality, via a network 114 (e.g., the Internet) to one or more clients. The one or more clients may include users that utilize the network based publisher 112 as a transaction intermediary to facilitate the exchange data over the network 114 corresponding to user transactions. User transactions may include receiving and processing item and item related data and user data from a multitude of users, such as payment data, shipping data, item review data, feedback data, etc. A transaction may also include party to party communications, such as a "first party" sending an encoded self-addressed postage-paid envelope to a second party to receive some item or information (e.g., brochures), where the encoding and decoding may be managed by the network-based publisher 112. A transaction intermediary such as the network based publisher 112 may include one or all of the functions associated with a shipping service broker, payment service and other functions associated with transactions between one or more parties. For simplicity, these functions are discussed as being an integral part of the network based publisher 112, however it can be appreciated that these functions may be provided by transaction systems remote from the network based publisher 112. For example, two transacting parties may utilize a third party shipping service broker and/or third party payment service (e.g., third party server 140 described below) outside of the network based publisher 112.

In various embodiments, the data exchanges within the transaction system 100 may be dependent upon user selected functions available through one or more client/user interfaces (UIs). The UIs may be associated with a client machine, such as a client machine 120 utilizing a web client 116. The web client 116 may be in communication with the network based publisher 112 via a web server 126. The UIs may also be associated with a client machine 122 utilizing a client application 118, or a third party server 140 hosting a third party application 138. It can be appreciated in various embodiments the client machine 120, 122 may be associated with a buyer, a seller, payment service provider or shipping service provider, each in communication with the network based publisher 112 and optionally each other. The buyers and sellers may be any one of individuals, merchants, etc.

Returning to FIG. 1, the network based publisher 112 may include data exchange functions to collect shipping data from buyers and selectively provide portions of that data to sellers and shipping service providers. In one embodiment, these functions allow a seller (e.g., a merchant) to receive payment and shipping data from the network based publisher 112. The shipping data may include encoded data that may be printed and applied to a shipping container (e.g., box, envelope, etc.) that is decoded by a shipping service provider (e.g., Federal Express®, etc.) to reveal the buyers identity and shipping address.

Turning specifically to an embodiment of the network based publisher 112 architecture, an application program interface (API) server 124 and a web server 126 are coupled to and provide programmatic and web interfaces respectively to one or more application servers 128. The application servers 128 host one or more transaction applications 130 and publication applications 132.

An application program interface (API) server 124 and a web server 126 provide programmatic and web interfaces to one or more application servers 128. The application servers 128 may host one or more other applications, such as transaction applications 130 and publication applications 132. The application servers 128 may be coupled to one or more data servers 134 that facilitate access to one or more storage devices, such as the data storage 136.

The transaction applications 130 may provide a number of payment processing modules to facilitate processing payment information associated with a buyer purchasing an item from a seller. The publication applications 132 may include various modules to provide a number of publication functions and services to users that access the network based publisher 112. For example, these services may include, inter alia, formatting and delivering search results to a client. The shipping applications may include various modules to provide a number of shipping functions and services to the buyer and seller alike. For example, offering of a shipping option to shield a buyer's identity by providing the seller with an encoded shipping label for the item purchased by the buyer.

FIG. 1 also illustrates an example embodiment of a third party application 138, which may operate on a third party server 140 and have programmatic access to the network based publisher 112 via the programmatic interface provided by the API server 124. For example, the third party application 138 may utilize various types of data retrieved from the network based publisher 112 and support one or more features or functions normally performed at the network based publisher 112. For example, the third party application 138 may receive a copy of all or a portion of the data storage 136 that includes buyer shipping data and act as the transaction intermediary between the buyer and seller with respect to functions such as shipping and payment functions. Additionally, in another embodiment, similar to the network based publisher 112, the third party application 138 may also include modules to perform operations pertaining to payment, shipping, etc. In yet another embodiment, the third party server 140 may collaborate with the network based publisher 112 to facilitate transactions between buyers and sellers, such as by sharing data and functionality pertaining to payment and shipping, etc.

Applications

Figure 2:
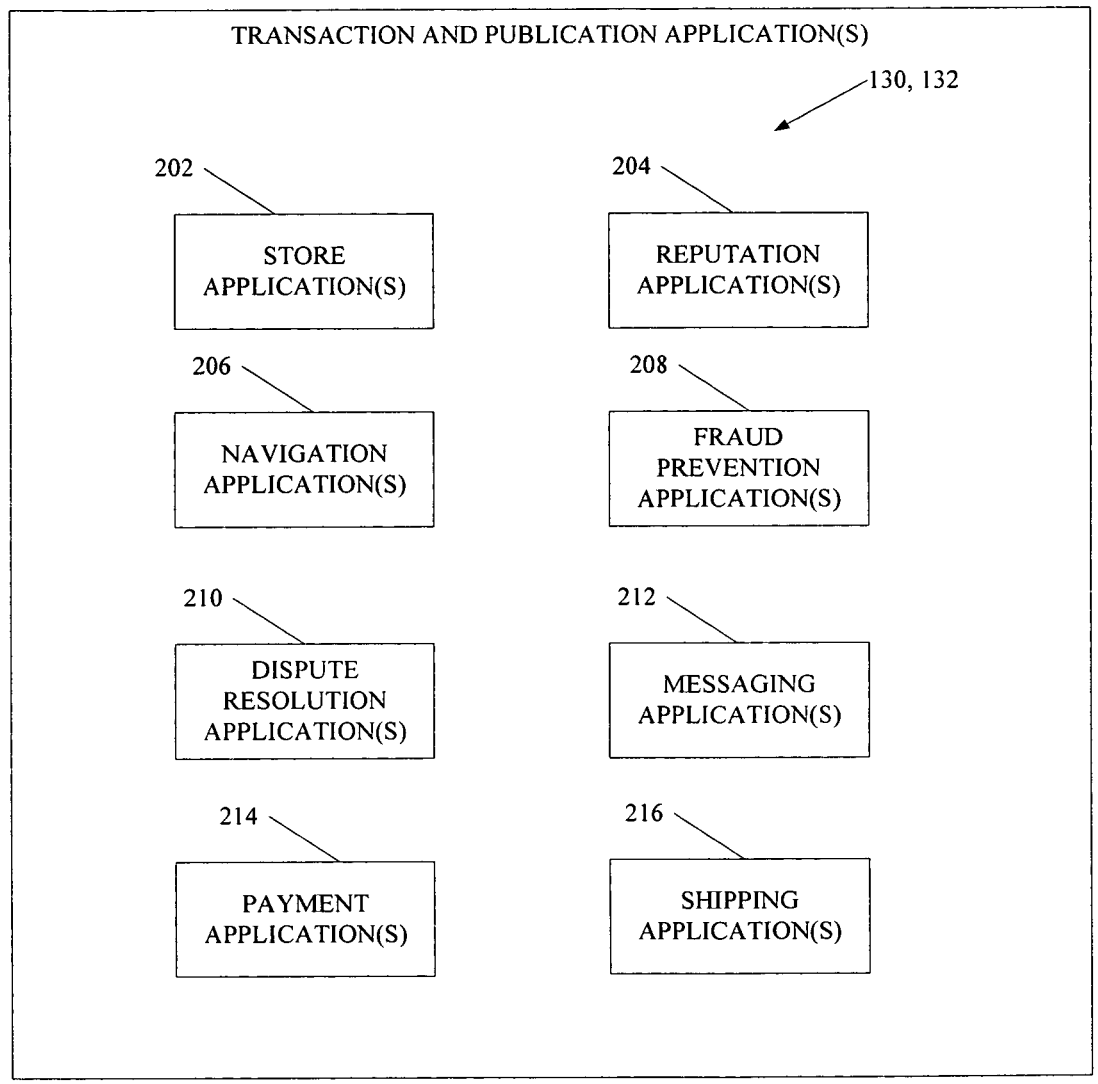
FIG. 2 is a block diagram illustrating an example embodiment of multiple transaction and publication applications which are provided as part of the network based publisher.

FIG. 2 is a block diagram illustrating an example embodiment of multiple transaction and publication applications 130, 132, respectively, which are provided as part of the network based publisher 112. The network based publisher 112 may provide a number of shopping, listing and price-setting, payment, shipping, and social networking mechanisms in which a seller may engage in item transactions, such as for goods or services.

To this end, the transaction and publication a 130, 132 are shown to include one or more applications which support the network based publisher 112. Store applications 202 may allow sellers to group their listings (e.g., goods and/or services) within a "virtual" store, which may be branded and otherwise personalized by and for the sellers. Such a virtual store may also offer promotions, incentives and features that are specific and personalized to a relevant seller. In one embodiment, the listings and/or transactions associated with the virtual store and its features may be provided to one or more community groups having an existing relationship with the item list creator. An existing relationship or association may include a friend or family relationship, a transactional relationship (e.g., prior sales with user), or an overall network community relationship (e.g., buyers historical transaction rating).

Reputation applications 204 may allow parties that transact utilizing the network based publisher 112 to establish, build and maintain reputations, which may be made available and published to potential trading partners. Consider that where, for example, the network based publisher 112 supports person-to-person trading, users may have no history or other reference information whereby the trustworthiness and/or credibility of potential trading partners may be assessed. The reputation applications 204 may allow a user, for example through feedback provided by other transaction partners, to establish a reputation within the network based publisher 112 over time. Other potential trading partners may then reference such a reputation for the purposes of assessing credibility, trustworthiness, or the like. A user creating a shared item list and seeking reviews and recommendations associated with the listed items may therefore rely, all or in part, on another user's established credibility in determining whether or not to add that person to their community group, which may access the shared item list, and in some embodiments, make purchases based on the shared item list.

Navigation of the network based publisher 112 may be facilitated by one or more navigation applications 206. For example, a search application may, inter alia, enable key word searches of listings published via the network based publisher 112. A browser application may allow users via an associated user interface to browse various category, catalogue, inventory, social network, and review data structures within the network based publisher 112. Various other navigation applications (e.g., an external search engine) may be provided to supplement the search and browsing applications.

A number of fraud prevention applications 208 may implement various fraud detection and prevention mechanisms to reduce the occurrence of fraud within the network based publisher 112. In one embodiment, the fraud prevention applications 208 may monitor activities of each user (e.g., buyers and sellers) with respect to various types of transactions on the network-based publisher 112. For example, a buyer may indicate not receiving the item and the fraud prevention applications 208 may determine, based on shipping data (e.g., tracking and delivery information) received from the shipper and/or the seller that the item package was delivered to the correct entity at the correct address. In various embodiments, the network-based publisher 112 may utilize the fraud prevention applications 208 in conjunction with dispute resolution applications 210 to generate a resolution acceptable to each party.

The dispute resolution applications 210 provide mechanisms whereby disputes (e.g., a shipping dispute) arising between transacting parties may be resolved. For example, the dispute resolution applications 210 may provide guided procedures whereby the parties are guided through a number of steps in an attempt to settle a dispute. In the event that the dispute cannot be settled via the guided procedures, the dispute may be escalated to a third party mediator or arbitrator.

Messaging applications 212 may be used for the generation and delivery of messages to users of the network based publisher 112, such messages for example advising the item list creator and members of the community groups associated with an item list the status of the various items on the list (e.g., already purchased, etc.). In one embodiment, the messaging applications 212 may be used in conjunction with the social networking applications 210 to provide promotional and/or marketing to the community members associated with the item list to assist them in finding and purchasing items on the item list.

Payment applications 214 may provide a number of payment services and functions to users such as buyers and sellers of the network based publisher 112. The payment applications 214 may facilitate payment transactions between buyers and sellers by being an intermediary that may collect and distribute funds and securely handle seller and buyer currency data such as credit card numbers, bank account and routing data, etc. In another embodiment, the payment applications 214 allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the transaction and publication applications 130, 132. While the transaction and publication applications 130 and 132 are shown in FIG. 1 to both form part of the network based publisher 112, it will be appreciated that, in alternative embodiments, the payment applications 214 may form part of a payment service that is separate and distinct from the network based publisher 112 (e.g., via third party server 140).

The shipping applications 216 may provide a number of shipping and handling services and functions to users of the network based publisher 112. The functions may include collecting data from buyers, sellers, and shippers and selectively providing portions of the collected data back to the buyers, sellers and shippers. For example, a buyer may provide a name and shipping address to the network based publisher 112. In a transaction between the buyer and seller, the network based publisher 112 may provide the seller with encoded shipping data and the shipper with actual shipping data (e.g., buyer name and address) via a decoding scheme, thus shielding the buyer's personal/shipping data from the seller.

It will be appreciated that one or more the various example transaction and publication applications 130, 132 may be combined into a single application. Further, in some embodiments of the inventions one or more applications may be omitted and additional applications may also be included.

Data Structures

Figure 3:
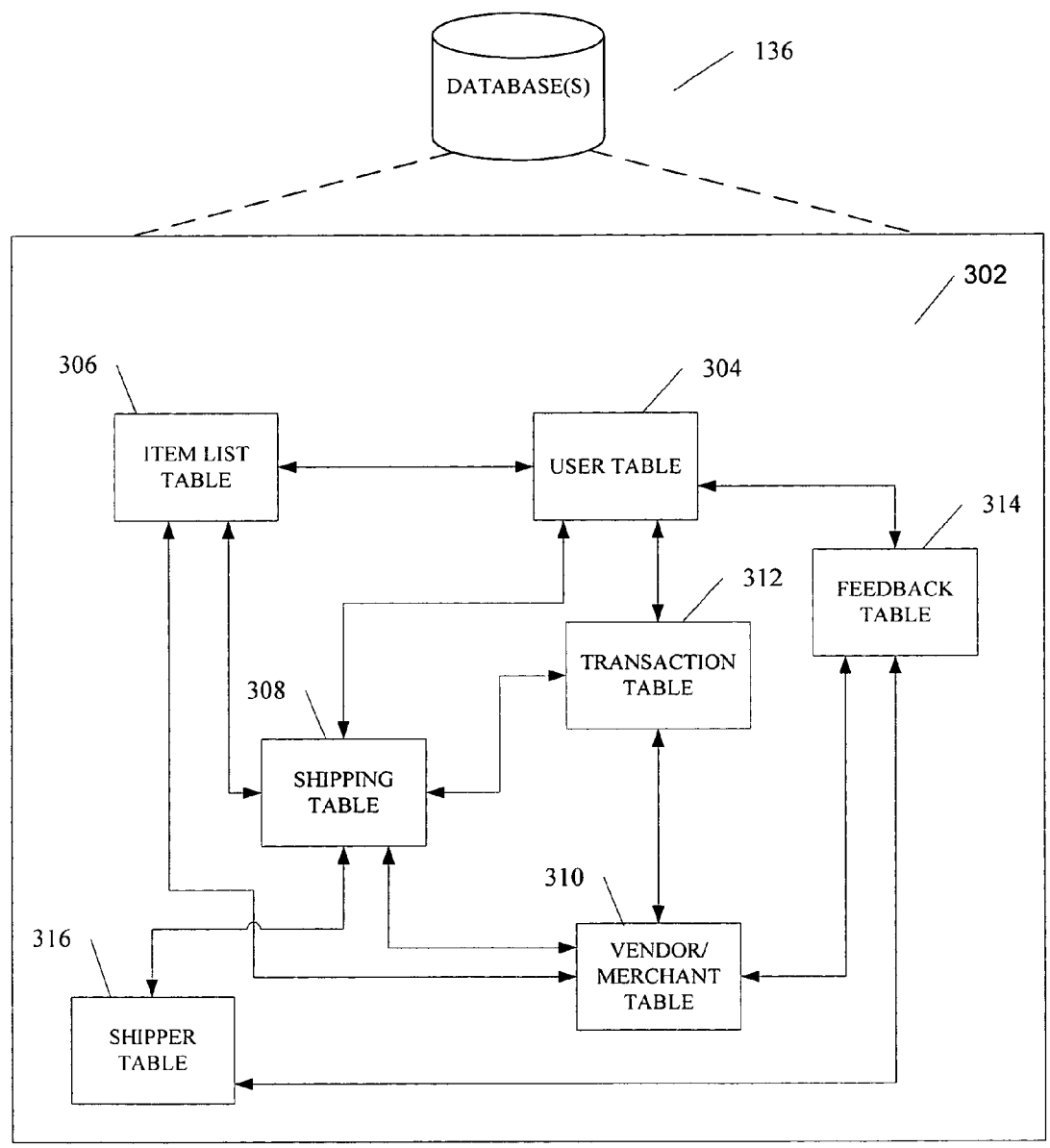
FIG. 3 is a high-level entity-relationship diagram, in accordance with an example embodiment, illustrating various tables that may be maintained within the databases, and that may be utilized by and support the transaction and publication applications.

FIG. 3 is a high-level entity-relationship diagram, in accordance with an example embodiment, illustrating various tables 302 that may be maintained within the databases 136 (see FIG. 1), and that may be utilized by and support the transaction and publication applications 130 and 132, respectively. A user table 304 may contain a record for each registered user of the network based publisher 112, and may include a user identifier (e.g., screen name), user name, user address, user financial instrument information (e.g., credit card, bank data, etc.), shipping preferences including preferred shipping service provider.

The tables 302 may also include an item list table 306 which maintains listing or item records for goods and/or services that were created by an item list creator (e.g., seller/merchant) using the transaction and publication applications 130, 132. Each listing or item record within the item list table 306 may furthermore be linked to one or more other records such as the user table 304, a shipping table 308, and a merchant table 310.

The shipping table 308 may include past, present, and future shipping records pertaining to items bought/sold and shipped via the network based publisher 112. The shipping table 308 may be associated with the user table 304, the merchant table 310, a transaction table 312, and a shipper table 316.

The transaction table 312 may contain a record for each transaction pertaining to items or listings for which records exist within the items table 306. The transaction table 312 may be associated with the user table 304, the shipping table 308, and the merchant table 310. A feedback table 314 may be utilized by one or more of the reputation applications 204 to construct and maintain reputation information associated with users of the network based publisher 112 (e.g., buyers, sellers, merchants, and shippers).

Processes

Figure 4:
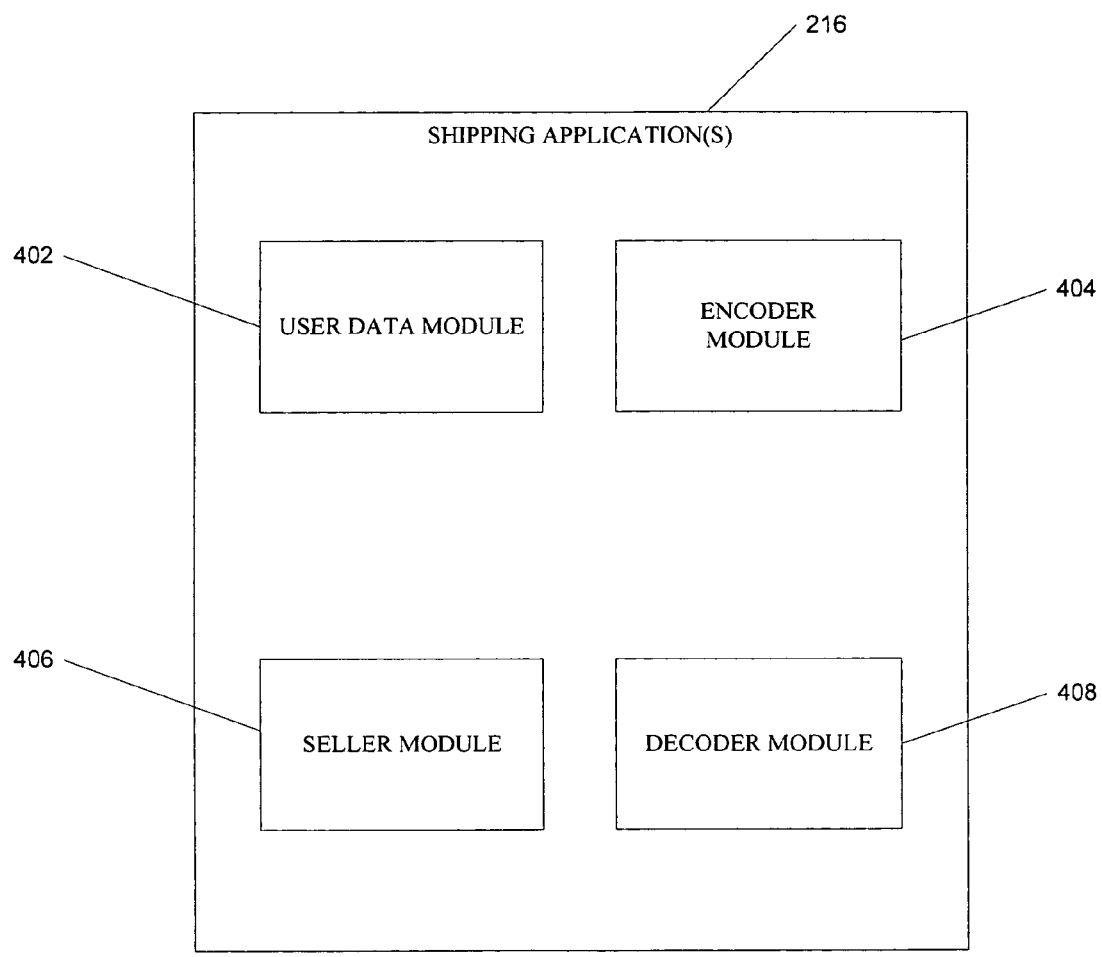
FIG. 4 illustrates an example embodiments of shipping application(s) and respective modules to protect private data associated with users of the transaction system.

FIG. 4 illustrates an example embodiments of shipping application(s) 216 and respective modules to protect private data associated with users of the transaction system 100. In one embodiment, the shipping application(s) 216 in FIG. 4 include a user data module 402, an encoder module 404, a seller module 406, and a decoder module 408. The user data module 402 may be configured to work with the various components of the network-based publisher 112 to receive and process user data. For example, a user using client machine 120 may interface with the web server 126 through the network 114 to provide the network-based publisher 112 with associated user data. The user data may then be added to the database (e.g., database 136) in one or more user data records and organized into tables such as the user table 304. The user data may include, inter alia, a user name, a user alias (e.g., screen name), a shipping address, and various user preferences such as carrier preference (e.g., FedEx®), shipping privacy preference and payment preference (e.g., credit card data, bank data, etc.).

The encoder module 404 may be configured to generate encoded data from various portions of user data collected by the user data module 402. In one embodiment, the encoder module 404 may interface with a seller module 406 and a decoder module 408 operating under the web client 116 or the client application 118 as illustrated and described with reference to FIG. 1. For simplicity, hereinafter all referenced clients in the various embodiments described being utilized by any one or all of the buyer, seller, and shipping service provider will be their own respective web clients 116 using the web server interface 126 of the network-based publisher 112. However, it can be appreciated, as described above with reference to FIG. 1, that the buyer, seller or shipping service provider may also use a standalone client application such as the client application 118 of the client machine 122, which may include all or a portion of the functionality described with reference to the shipping application(s) 216.

In one embodiment, after a transaction has concluded between a buyer and a seller in the transaction system 100, the encoder module 404 extracts data from the buyer's user data record and encodes at least a portion of the data to create an encoded identifier that is communicated to the seller module 406 and the decoder module 408. For example, the encoder module 404 may extract the shipping address, the name, and preferences of the buyer and encode only the shipping address and the name. The encoded data along with any additional non-private non-encoded data (e.g., shipping preferences, etc.) may then be communicated to the seller using a client machine (e.g., the client machine 120). Alternatively, the encoder module 404 may encode all of the buyer's data (private and non-private) to be communicated to the shipping service provider in creating the encoded identifier.

In one embodiment, the encoder module 404 encodes the data by creating a barcode from the buyer's shipping address and name. In another embodiment, the encoder module 404 may use a key (e.g., cryptographic key, public/private, etc.) that is used by the shipping service provider to decode the received encoded identifier. In yet another embodiment, a unique encoded identifier may be created for each user (e.g., buyers) including a unique key which may be used by the shipping service provider to obtain a user's shipping data.

In one embodiment, the transaction system may use a multi-use encoding scheme wherein a first party may use the same encoded address information with multiple second parties. For example, a multi-use encoder may be used and decoded to receive one or more mailings at various times from a second party. It can be appreciated in various other embodiments that a multitude of encoding schemes may be applied to any or all of the communicated data (e.g., private and non-private data) without departing from the spirit and scope of the methods described herein.

After the seller module 406 has received the data including the encoded data from the encoder module 404, the seller module 406 may determine additional shipping preferences based on the received user data (e.g., carrier preference) and generate the encoded shipping label to include on one or more shipping packages associated with the transaction between the buyer and seller. The encoded shipping label may be affixed to each package that in turn is processed by the shipping service provider.

In one embodiment, the shipping service provider receives the package including the encoded shipping label. The service provider then uses its web client (e.g., web client 116) to login into the network-based publisher 112 to process the encoded shipping label. Specifically, a decoder module may be utilized to decode the encoded shipping label to determine the buyer's shipping data, such as the buyer's name and physical shipping address. The shipping service provider may then generate a new shipping label to apply to each package. In various embodiments, the encoded data may be entered in the server provider system by any entry method known in the art, such as manual entry, scanner (e.g., barcode optical scanner/reader), RFID (radio frequency identification) tag and receiver, etc.

In various embodiments, the user shipping data may be directly encoded in the encoded shipping label or may be an identifier that may be communicated back to the network-based publisher 112 that in turn retrieves and communicates the user shipping data to the shipping service provider.

Figure 5:
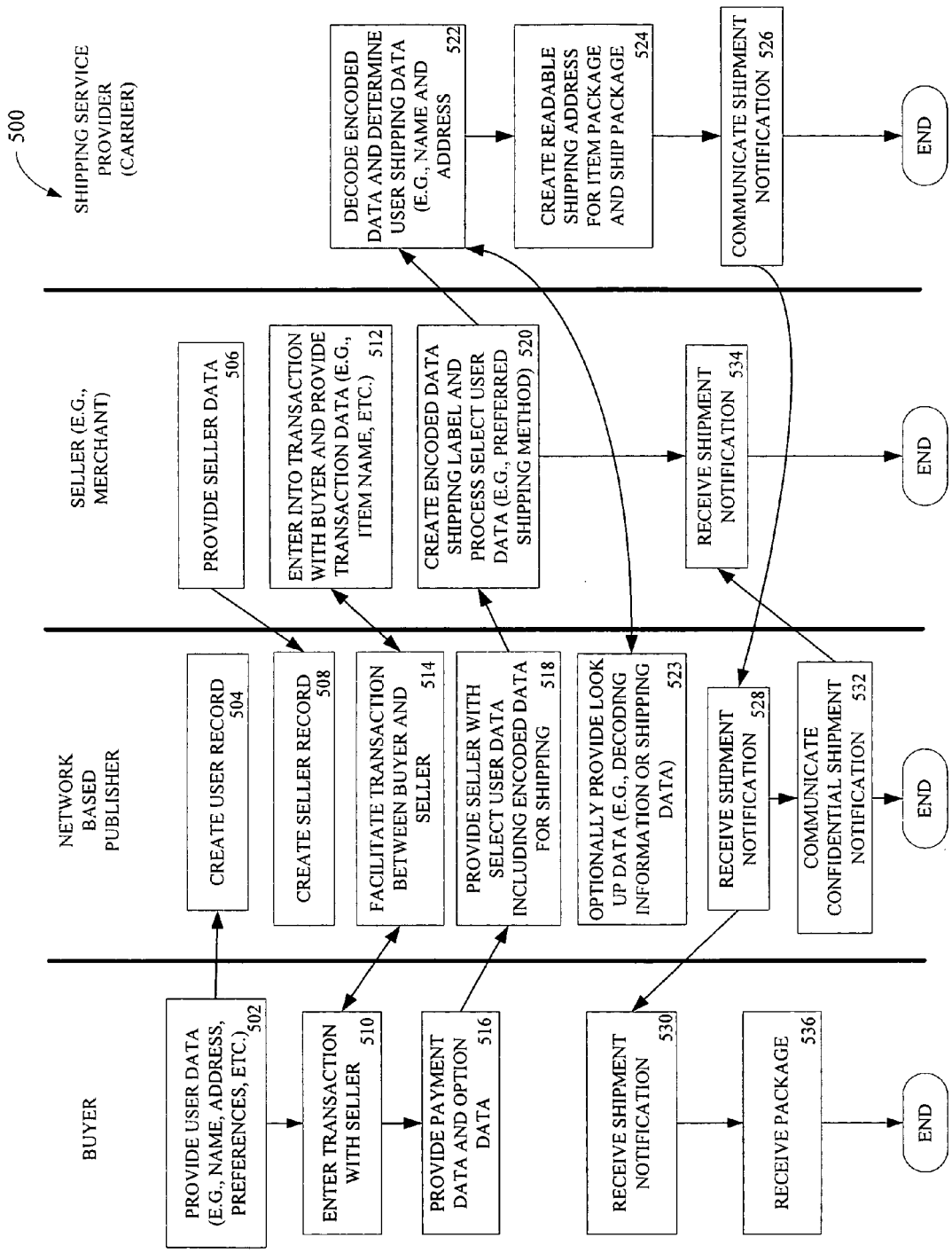
FIG. 5 is illustrates a flowchart of example processes for a buyer, a seller, a network based publisher and a shipping service provider to utilize the transaction system to facilitate the buying and receiving of items with the transaction system.

FIG. 5 is illustrates a flowchart 500 of example processes for a buyer, a seller, a network based publisher and a shipping service provider to utilize the transaction system 100 to facilitate the buying and receiving of items with the transaction system 100. The process begins at operation 502 where the buyer via a client machine (e.g., client machine 120, 122) initially provides the network-based publisher 112 the user data, including user shipping data. For example, this may include such data as user name, screen name, shipping address, shipping preferences, payment data, etc. At operation 504, the network-based publisher 112 creates a user record to store in the database 136.

At operation 506, the seller provides seller data to the network-based publisher 112. The seller data may include, but is not limited to, seller name, address, phone number, item lists, payment options, carrier options, etc. The network-based publisher 112, at operation 508, may then create a seller record to be stored in the database 136.

The buyer, at operation 510, enters into a transaction with the seller, and the seller enters into the transaction with the buyer and provides transaction data at operation 512. The transaction is facilitated at operation 514 by the network-based publisher 112. At operation 516, the buyer provides the network-based publisher 112 with payment data and additional selected option data, if any. In response, the network-based publisher 112 provides, at operation 518, the seller with select user data including data encoded by the network-based publisher 112 pertaining to the user shipping data. Based on the received user data from the network-based publisher 112, the seller, at operation 520, creates an encoded shipping label (e.g., barcode label) to affix to a package associated with the transaction and processes any user selected options provided with the user data. For example, a user option may indicate the user prefers using the United States Postal Service over other carriers and specifically, a two day ground option.

At operation 522, the shipping service provider receives the package including the encoded shipping label and decodes the shipping label to determine the user shipping data (e.g., name and physical shipping address). As discussed above, the encoded label may be decoded and the user shipping data retrieved locally, communicated to and decoded by the network-based publisher 112, or any combination thereof.

The shipping service provider, at operation 524, then creates a new shipping label including physical shipping address of the buyer and ships package. Additionally, the shipping service provider may also, at operations 526, 528, and 530, generate and communicate a shipment notification message to the network-based publisher 112 and the buyer. At operation 532, the shipping service provider communicates a confidential shipping notification to the seller and the seller receives the notification at operation 534. For example, the confidential shipping notification may only identify the buyer by a transaction or buyer identifier that does not include the shipping data (e.g., name, address, etc.). Lastly, at operation 536, the buyer receives the package.

Figure 6:
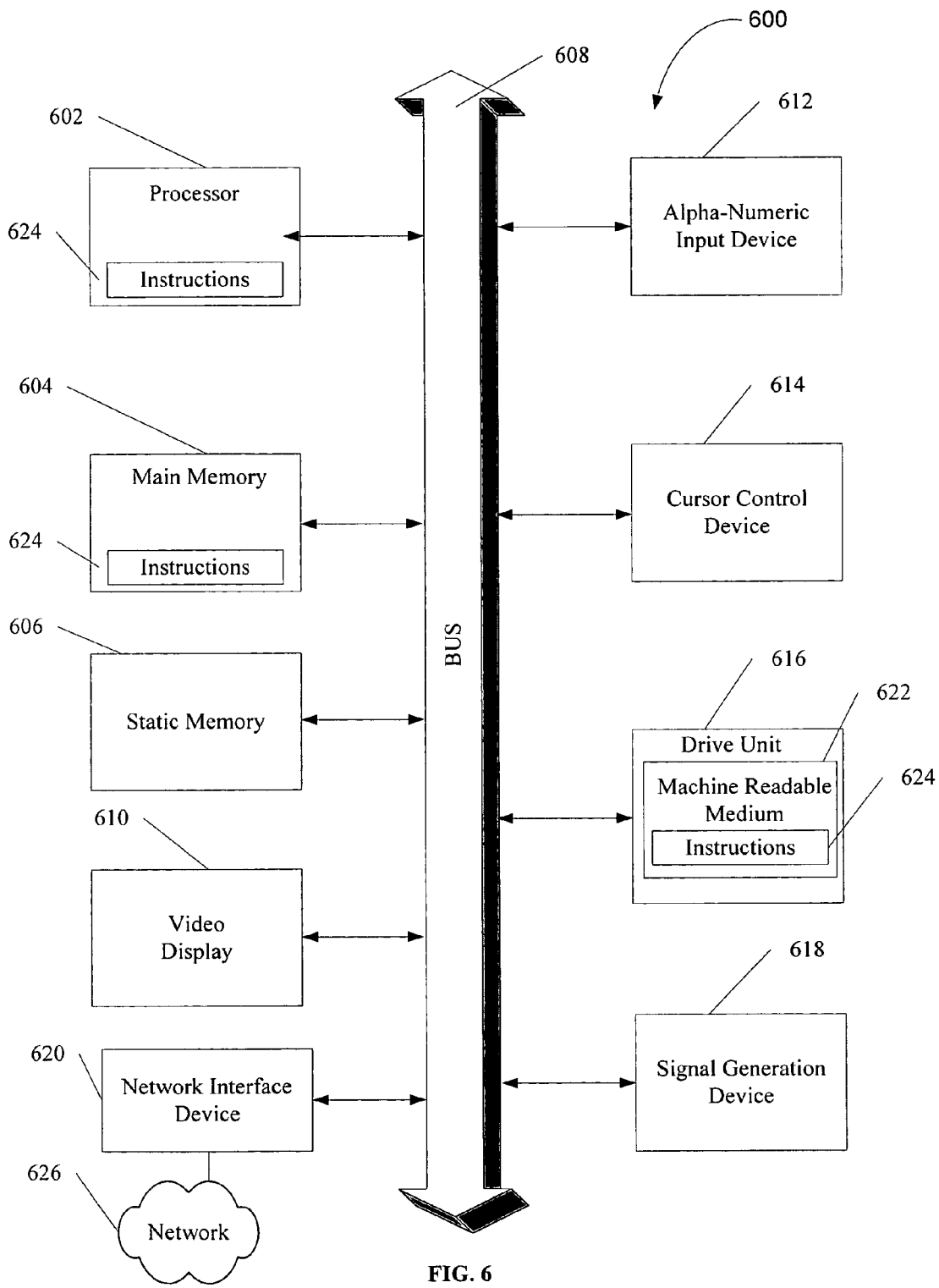
FIG. 6 shows a diagrammatic representation of machine in the example form of a computer system within which a set of instructions may be executed causing the machine to perform any one or more of the methodologies discussed herein.

FIG. 6 shows a diagrammatic representation of machine in the example form of a computer system 600 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in example embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Furthermore, the following claims are hereby incorporated into the Detailed Description, with each claim standing on its own as a separate embodiment.

The invention claimed is:

1. A method, comprising:
extracting shipping data and shipping preferences, using one or more processors, from a user record of a first party;
generating, at a third party, an encoded identifier representing the shipping data associated with the first party, the shipping data being associated with a transaction between the first party and a second party, the shipping data being stored at the third party performing the extracting and the generating; and
communicating the encoded identifier and the shipping preferences to the second party to create, based on the shipping preferences, a shipping label data file including the encoded identifier that, when decoded by a fourth party shipping service provider, provides a shipping label based upon the shipping data of the first party, the third party and fourth party shipping service provider being different entities.

2. The method of claim 1, further comprising receiving a request from the fourth party shipping service provider to provide the shipping data, the request including the encoded identifier.

3. The method of claim 2, further comprising retrieving the shipping information based on the encoded identifier and communicating the shipping information to the fourth party shipping service provider.

4. The method of claim 1, further comprising generating a unique encoded identifier representing the shipping data associated with the first party for each transaction between the first party and the second party.

5. The method of claim 1, further comprising communicating shipping data for a plurality of users to the fourth party shipping service provider to store in its storage system, wherein the fourth party shipping service provider decodes the encoded identifiers and retrieves the shipping data from the storage system.

6. The method of claim 4, further comprising communicating decoding information from the third party to the fourth party shipping service provider, the decoding information being used to decode the unique encoded identifier to obtain the shipping data.

7. The method of claim 1, further comprising receiving the shipping data from the first party and creating the user record, wherein the shipping data includes at least one record entry from a list of record entries consisting of name, address, payment data, shipping privacy preference, shipping service provider preference, and one or more item identifiers associated with the transaction.

8. The method of claim 1, wherein the shipping data is directly encoded in the shipping label data file.

9. A system, comprising:
one or more servers associated with a third party, the one or more servers comprising:
an encoder module to extract shipping data and shipping preferences from a user record of a first party stored at the third party and to generate, at the third party, an encoded identifier comprised of the shipping data associated with the first party, the shipping data being associated with a transaction between the first party and a second party;
a seller module to send the encoded identifier and the shipping preferences from the encoder module to the second party, the second party to create, based on the shipping preferences, a shipping label including the encoded identifier; and
a decoder module to be used by a fourth party shipping service provider to decode the shipping label associated with a package received from the second party to generate shipping data associated with the first party for the package, the third party and fourth party shipping service provider being different entities.

10. The system of claim 9, further comprising a user data module to receive a request from the fourth party shipping service provider to provide the shipping data, the request including the encoded identifier.

11. The system of claim 10, wherein the user data module is further configured to retrieve the shipping information based on the encoded identifier and to communicate the shipping information to the fourth party shipping service provider.

12. The system of claim 9, wherein the encoder module is further configured to generate a unique encoded identifier representing the shipping data associated with the first party for each transaction between the first party and the second party.

13. The system of claim 12, wherein the seller module is further configured to communicate decoding information to the fourth party shipping service provider, the decoding information to decode the unique encoded identifier to obtain the shipping data.

14. The system of claim 9, further comprising a user data module to communicate shipping data for a plurality of parties associated with a network-based publishing system to the fourth party shipping service provider, wherein the decoder module is arranged to decode the encoded identifier and retrieve the shipping data from a local storage.

15. The system of claim 9, further comprising a user data module to receive the shipping data from the first party and to create the user record, wherein the shipping data includes at least one record entry from a list of record entries consisting of name, address, payment data, shipping privacy preference, shipping service provider preference, and one or more item identifiers associated with the transaction.

16. A method, comprising:
receiving, from a third party, an encoded identifier and shipping preferences at a second party, the encoded identifier generated from shipping data extracted from a user record of a first party stored at the third party and associated with the first party engaged in a transaction for one or more items with the second party; and
creating, using one or more processors and based on the shipping preferences, a shipping label including the encoded identifier for the one or more items that, when decoded by a fourth party shipping service provider, provides the shipping data of the first party, the third party and fourth party shipping service provider being different entities.

17. The method of claim 16, wherein the receiving the encoded identifier includes receiving the encoded identifier from a transaction intermediary.

18. The method of claim 16, further comprising receiving transaction data, the transaction data including at least one from the list of transaction data consisting of payment data, one or more item identifiers, and shipping preference.

19. A method, comprising:
receiving, at a fourth party shipping service provider, a shipping package having a shipping label including an encoded identifier, the encoded identifier generated from shipping data extracted from a user record of a first party stored at a third party and sent by the third party to the second party, the shipping label created based on shipping preferences extracted from the user record of the first party; and
decoding the encoded identifier, using one or more processors, to obtain the shipping data of the first party, the shipping data pertaining to a shipping address of the first party that transacted for one or more items with a second party, the third party and fourth party shipping service provider being different entities.

20. The method of claim 19, wherein decoding the encoded identifier includes translating the encoded identifier into readable text, the readable text including at least the shipping address.

21. The method of claim 20, wherein the decoding the encoded identifier further includes:
communicating the encoded identifier to a transaction intermediary, the transaction intermediary facilitating the transaction between the first party and second party; and
receiving the shipping data from the transaction intermediary, the shipping data being used to ship the shipping package to the first party.

22. A non-transitory machine-readable storage medium embodying instructions which, when executed by a machine, causes the machine to perform a method, the method comprising:
extracting shipping data and shipping preferences from a user record of a first party;
generating, at a third party, an encoded identifier representing the shipping data associated with the first party, the shipping data being associated with a transaction between the first party and a second party, the shipping data being stored at the third party performing the extracting and the generating; and
communicating the encoded identifier and the shipping preferences to the second party wherein the second party creates, based on the shipping preferences, a shipping label including the encoded identifier that when decoded by a fourth party shipping service provider provides the shipping data of the first party, the third party and fourth party shipping service provider being different entities.

* * * * *